US006594245B1

(12) United States Patent
Rimhagen et al.

(10) Patent No.: US 6,594,245 B1
(45) Date of Patent: Jul. 15, 2003

(54) METHOD AND SYSTEM FOR ENABLING A REMOTE COMMUNICATION STATION TO ENGAGE MULTIPLE COMMUNICATION STATIONS

(75) Inventors: Thomas Rimhagen, Linköping (SE); Magnus Frodigh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/280,408

(22) Filed: Mar. 29, 1999

(51) Int. Cl.$^7$ ............................................... H04B 7/212
(52) U.S. Cl. ...................... 370/337; 370/458; 370/468; 455/450
(58) Field of Search ................................ 370/458, 468, 370/329, 337, 461, 536, 336, 345, 347, 349, 442, 474, 478; 455/452, 422, 450, 453, 500, 507; 375/260

(56) References Cited

U.S. PATENT DOCUMENTS

| | | | |
|---|---|---|---|
| 4,968,966 A | 11/1990 | Jasinski et al. | 340/825.44 |
| 5,598,417 A | 1/1997 | Crisler et al. | 370/348 |
| 5,721,762 A | 2/1998 | Sood | 379/59 |
| 5,722,053 A | 2/1998 | Kornfeld et al. | 455/86 |
| 5,781,536 A | 7/1998 | Ahmadi et al. | 370/252 |
| 5,787,079 A | 7/1998 | Bateman et al. | 370/343 |
| 5,914,948 A * | 6/1999 | Frank | 370/310.1 |
| 6,108,552 A * | 8/2000 | Edwards et al. | 370/329 |
| 6,223,041 B1 * | 4/2001 | Egner et al. | 455/450 |
| 6,266,330 B1 * | 7/2001 | Jokinen et al. | 370/280 |

FOREIGN PATENT DOCUMENTS

| | | |
|---|---|---|
| EP | 102836 | 10/1999 |
| WO | WO 95/31878 | 11/1995 |
| WO | WO 96/10320 | 4/1996 |
| WO | WO 99/09779 | 2/1999 |
| WO | PCT/SE00/00478 | 8/2000 |

OTHER PUBLICATIONS

Resource management for third generation cellular communication systems, Chen, Rao Vehicular Technology Conference, 1997, IEEE 47th , vol.: 3, 1997 pp.: 1832–1836 vol. 3.*
CBWL: a new channel assignment and sharing method for cellular communication systems Jiang, H.; Rappaport, S.S. Vehicular Technology, IEEE Transactions on , vol.: 43 Issue: 2 , May 1994.*
A. M. Chen and R. R. Rao, "Resource Management for Third Generation Cellular Communication Systems"; IEEE Vehicular Technology Conference, US, New York, IEEE, vol. Conf. 47; May 4, 1997; XP000738680; pp. 1832–1836.
Evolution of Wireless Data Services: IS–95 to CDMA2000 by Douglas N. Knisely, Sarah Kumar, Subhasis Laha and Sanjiv Nanda; IEEE Communications Magazine, vol. 36, No. 10; Oct. 1, 1998, pp. 140–149, XP000785922.

* cited by examiner

Primary Examiner—Dang Ton
Assistant Examiner—Bob A. Phunkulh
(74) Attorney, Agent, or Firm—Jenkens & Gilchrist, P.C.

(57) ABSTRACT

A method and system enables high data-rate users to be serviced even from within congested cells. If a user that is associated with an MS is located within a first cell that is too congested to provide the bandwidth requested by the user, all or a part of the information flow to/from the MS may be transceived from/to other nearby cells. For example, in a TDMA system, a user requiring three time slots per frame in order to aggregate sufficient bandwidth may be in communication with three different cells during each frame. The present invention may additionally be applied in the context of handoffs when, for example, an MS continues to be partially served by the previous cell before the new cell is able to service the high data-rate information flow. In another embodiment, the present invention may be implemented in a local wireless network environment in which multiple radio heads are controlled by a HUB.

21 Claims, 4 Drawing Sheets ting a sufficient bandwidth to accommodate a high data-rate. In still another embodiment, an MS is in communication with a local wireless network controlled by a local controller (e.g., a HUB). The HUB may order several radio heads of the local wireless network to service a high data-rate user.

METHOD AND SYSTEM FOR ENABLING A REMOTE COMMUNICATION STATION TO ENGAGE MULTIPLE COMMUNICATION STATIONS

BACKGROUND OF THE INVENTION

1. Technical Field of the Invention

The present invention relates in general to the field of wireless communications, and in particular, to enabling a remote communication station (RCS) to engage multiple communication stations (CSs) for a single information flow.

2. Description of Related Art

Wireless communication enables subscribers to place and receive calls from various locations. The increased safety, productivity, and convenience of wireless communication has led to explosive growth across most wireless networks. Meeting the demands of this explosive growth can be difficult and costly. The wireless system is planned well in advance of deployment and is subsequently periodically updated and expanded according to subscriber demands.

In addition to explosive growth in terms of sheer numbers of subscribers, bandwidth demands of individual subscribers are increasing as well. For example, some subscribers may want their speech and sound processed by a codec employing the highest possible bit rate for maximizing speech and sound quality. Other subscribers may have tremendous bit rate demands for transceiving data. In traditional wireless systems, such as time-division multiple access (TDMA) systems, each mobile station (MS) is assigned a single time slot per frame for transceiving all types and all bit-rates of traffic and is in communication with only one base station (BS).

This single time slot/one base station combination provides a bandwidth that may be inadequate for many users. Even if a wireless system were to provide a user the opportunity to transmit multiple time slots in a single frame to the one base station, the resources of the one base station would be rapidly depleted. One option for remedying these bandwidth limitations that result from resource depletion is to expand the wireless network by splitting congested cells into two or more cells. Unfortunately, this is a costly alternative that necessitates the expenditure of additional capital to purchase and install appropriate BS equipment. There is therefore a need in the art for a more cost-effective solution to the resource depletion problem in congested cells.

SUMMARY OF THE INVENTION

The deficiencies of the prior art are overcome by the method and system of the present invention. For example, as heretofore unrecognized, it would be beneficial if an MS could maintain a high data-rate information flow without relying on the depleted resources of a best-serving BS. In fact, it would be beneficial if the MS could be in communication with multiple serving BSs simultaneously so that overall information flow bandwidth to and from the MS may be increased.

In one embodiment of the present invention, a wireless user attempting to utilize an RCS (e.g., an MS) to engage in a high data-rate information flow is accommodated by a wireless network even when the best serving CS (e.g., a BS, a radio head, etc.) is heavily congested. When a user requests to initiate a new communication or to increase the bandwidth of a current communication (especially when the information flow becomes or would become a high data-rate information flow), the wireless network determines whether the current or best serving CS can meet the requested bandwidth. If so, that CS is assigned to service the requesting user.

If not, the wireless network searches for other candidate CSs that are not as congested and that can service the requesting user. If other candidate CSs are identified, then the wireless network assigns one or more CSs to service the requesting user. The information flow between the RCS of the user and the CSs of the wireless network is allocated between the multiple CSs. If no adequate candidate CSs are identified, the wireless network attempts to transfer other users to other CSs to create bandwidth resources for the requesting user. If this is unsuccessful, the request may be denied.

The present invention may be advantageously employed during a handover of a high data-rate user to ease the transition of the RCS to a heavily congested cell. In yet another embodiment, an MS transmits one packet to each of three different cells in three different time slots (e.g., in a single frame) in order to aggregate a sufficient bandwidth to accommodate a high data-rate. In still another embodiment, an MS is in communication with a local wireless network controlled by a local controller (e.g., a HUB). The HUB may order several radio heads of the local wireless network to service a high data-rate user.

An important technical advantage of the present invention is that it enables high data-rate users in congested coverage areas to be serviced.

Another important technical advantage of the present invention is that it provides higher performance for high data-rate users by adding more flexibility to radio resource allocation.

Yet another important technical advantage of the present invention is the ability to improve the probability of serving a high data-rate user when more than one radio head or BS may be utilized.

Yet another important technical advantage of the present invention is the ability to optimally handle handover situations involving high data-rate users.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–5 of the drawings, like numerals being used for like and corresponding parts of the various drawings.

Figure 1:
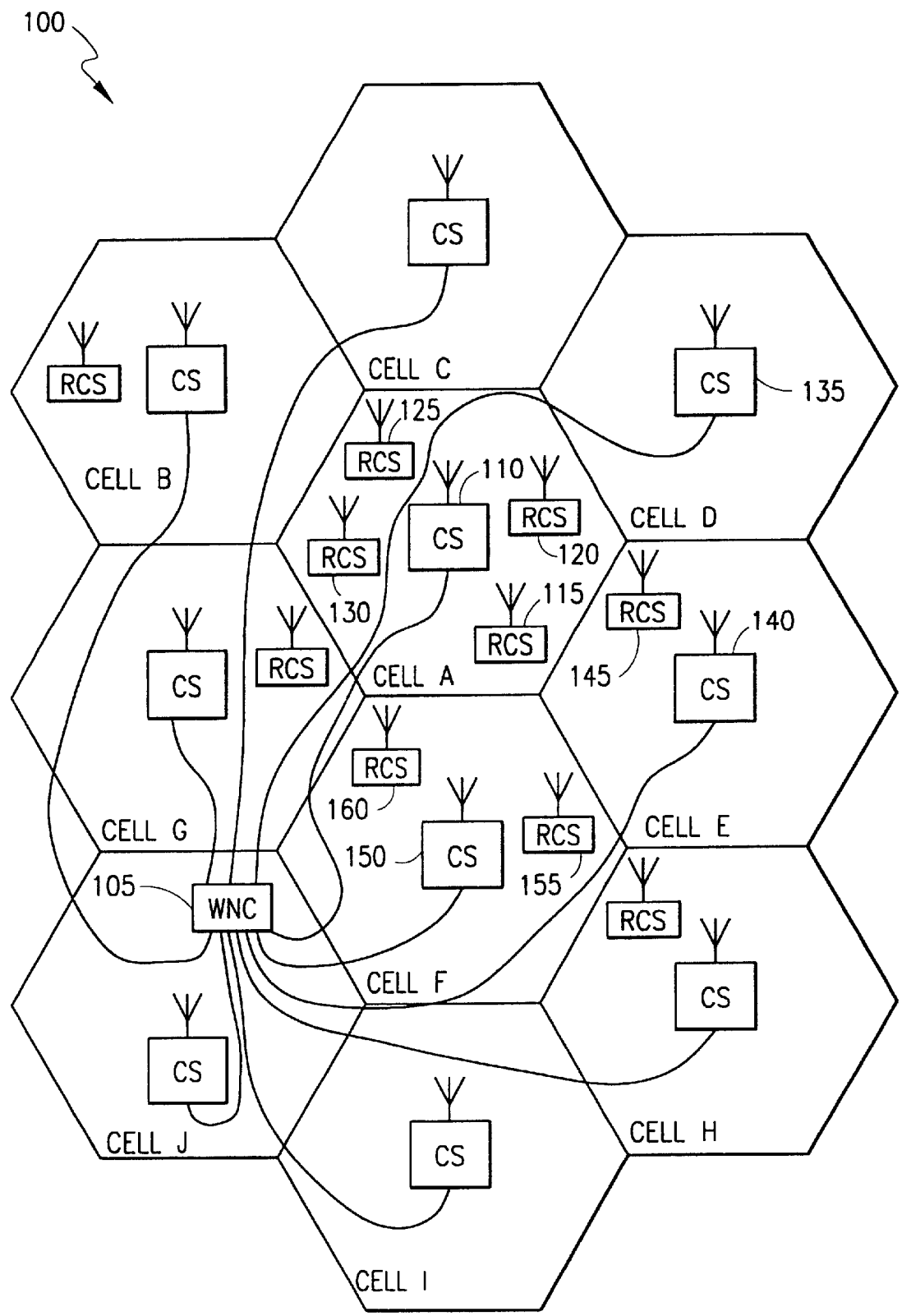
FIG. 1 illustrates ten cells within a wireless communications network of a type with which the present invention may be advantageously practiced.

Referring now to FIG. 1, ten cells within a wireless communications network of a type with which the present invention may be advantageously practiced are illustrated generally at 100. An arbitrary geographic area may be divided into a plurality of contiguous coverage units, namely Cells A–J, jointly designated as a wireless communications network by 100. While the wireless communications network (hereinafter "wireless network") 100 of FIG. 1 is illustratively shown to include only ten cells, it should be understood that in practice the number of cells can be significantly larger. It should also be understood that the principles of the present invention are applicable to many systems such as the Personal Digital Cellular System (PDC); the Global System for Mobile communications (GSM); American Digital Cellular (ADC) systems, in accordance with the IS-95 Standard for example; next-(e.g., third) generation systems, such as Wideband Code Division Multiple Access (WCDMA) or wideband IS-95 (e.g., IS-95+) implementations; satellite communications systems; etc.

Associated with, and located within each of the Cells A–J, is a CS (e.g., a BS, a radio head, etc.). It should be noted that omnidirectional CSs are exemplary only and that wireless networks that employ, for example, sectorized or directional CSs are equally benefited by the principles of the present invention. A plurality of RCSs (e.g., an MS, a computer with a wireless link, etc.) may also be found within certain ones of the Cells A–J. A wireless network controller (WNC) 105 (e.g, a mobile services switching center (MSC), a HUB of a local wireless network, etc.) of the wireless network 100 is illustrated within the Cell J, but the WNC 105 may be located within any of the Cells A–J or entirely outside all of the Cells A–J. The WNC 105 is connected by communication links (e.g., copper or fiber optic cables) to each of the illustrated CSs and to the fixed Public Switched Telephone Network (PSTN) (not shown), the Internet (not shown), or a similar fixed network, which may include an Integrated Services Digital Network (ISDN) facility.

Each of the Cells A–J is allocated a plurality of voice or speech channels (e.g., a traffic channel (TCH)) and at least one broadcast control channel (BCCH). The TCHs may also include, by way of example and without limitation, packet data channels for carrying, e.g., speech, pictures, general data/information, video, etc. The control channel is used to control or supervise the operation of RCSs through information transmitted to and received from those units. Such information may include call originations, page signals, page response signals, location registration signals, and voice channel assignments.

The present invention involves implementation of a method and system for ensuring that high data-rate information flows are possible even for RCSs within congested coverage areas. A method and system, which may be at least in part incorporated into wireless network logic, is introduced into the process of servicing requests for communication bandwidth from the RCSs in the wireless network 100. The process may entail serving a high data-rate request with multiple CSs when necessary or otherwise desirable.

While the wireless network 100 shows ten RCSs distributed throughout the network, it should be understood that the actual number will not only be greater, but the number will also be constantly varying. Particularly within a given coverage area (such as the Cell A), the number of RCSs constantly varies for a myriad of reasons. For example, the average number of RCSs within a particular cell changes over short periods of time (e.g., hours) due to daily schedules (e.g., business hours for downtown areas, rush hours for highways, etc.).

Advantageously, application of the principles of the present invention enables operators to meet high-bandwidth demands of subscribers in a busy cell by using inactive resources in a less-busy cell. For instance, the Cell A is shown with a CS 110 and RCSs 115, 120, 125, and 130 within the Cell A's coverage area of the wireless network 100. The Cell D is shown with a CS 135 and no RCSs currently within the Cell D's coverage area. The Cell E is shown with a CS 140 and an RCS 145 within the Cell E's coverage area. The Cell F is shown with a CS 150 and RCSs 155 and 160 within the Cell F's coverage area. In accordance with the principles of the present invention, when RCS 120 requires significant resources (e.g., multiple time slots) from the Cell A that Cell A cannot provide (e.g., either prudently or in any event), then additional time slot provisions may be established between RCS 120 and, for example, CS 135 or CS 140 or both. Likewise, when RCS 115 requires significant resources from the Cell A that Cell A cannot provide, then additional resources may be utilized via wireless connections with, for example, CS 140 or CS 150 or both.

High data-rate services (e.g., the ability to handle multimedia data) are being designed into third generation cellular systems. A high data-rate user demands a substantial part of a single CS's resources, both radio resources (e.g., spectrum) and hardware resources (e.g., transceiver usage, computing power, etc.). The number of high data-rate users per CS is likely to be low (e.g., one or two), and the trunking efficiency is therefore likely to be low also. The capability to provide service to high data-rate users is improved in accordance with the principles of the present invention when more than one CS shares the traffic to/from a single user. Third generation cellular systems are being designed around both code-division multiple access (CDMA) and TDMA technologies. In one particular embodiment, the principles of multiple serving CSs are applied to TDMA-based systems because the signals from the involved CSs are preferably orthogonal.

The novel principles of multiple serving CSs (e.g., BSs, radio heads, etc.) in accordance with the present invention may include splitting information between the multiple serving CSs. With multiple serving coverage units, the information flow is split between or among the serving CSs. The present invention should therefore not be confused with macro diversity (i.e., soft handoff) where identical information is sent to/from the user from/to several CSs. The ability to provide a user with a high data-rate via a single serving coverage unit (i.e., absent the present invention) is limited by hardware capabilities as well as the availability of free radio resources. Providing multiple serving coverage units may entail synchronizing the serving CSs as well as designing protocols that support more than one serving coverage unit. These and other aspects of providing multiple serving coverage units for a single RCS in order to aggregate bandwidth are addressed by the present invention.

Figure 2:
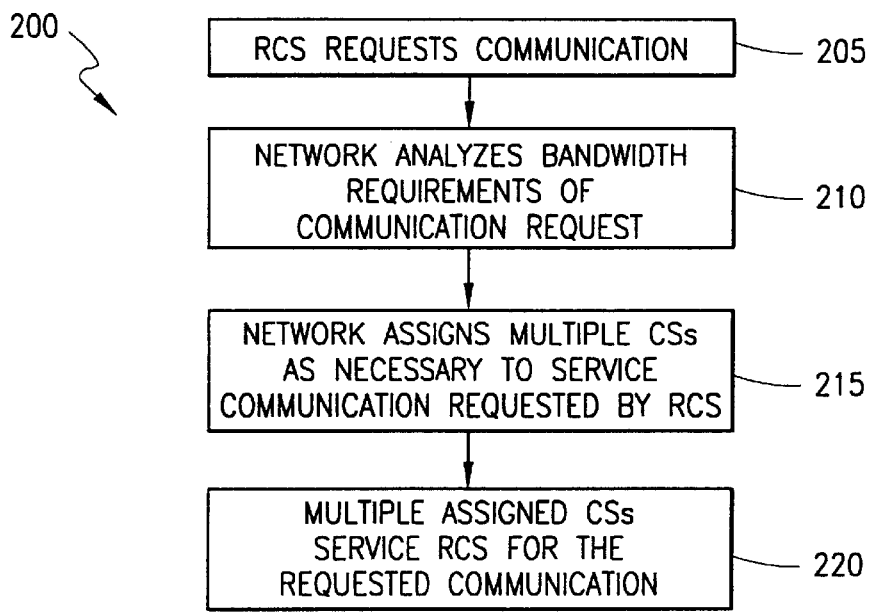
FIG. 2 illustrates an exemplary method in flowchart form for effectuating the servicing of a remote communication station by multiple coverage units in accordance with one embodiment of the present invention.

Referring now to FIG. 2, an exemplary method in flowchart form for effectuating the servicing of a remote communication station by multiple coverage units in accordance with one embodiment of the present invention is illustrated generally at 200. In many dense cellular systems, the RCSs are able to communicate (within coverage) with more than one CS most of the time. In order to improve the utilization of radio and hardware resources, the present invention assigns multiple serving CSs to a single user in one embodiment. A user of an RCS requests a communication (step 205). The request may be, for example, a request that initiates an information flow, a request that increases the bandwidth demands of an existing information flow, etc. The network analyzes the bandwidth requirements that would result or that are resulting from the communication request (step 210). The network component or components may be, for example, one or more CSs (e.g., a current-serving CS, a best-serving CS, etc.), the WNC of the network, etc.

The network assigns multiple CSs as necessary to service the communication requested by the RCS (step 215). The network may therefore assign multiple CSs when the bandwidth required for the communication request exceeds the available bandwidth resources of the best-serving CS and/or when transmissions of an acceptable signal quality between the requesting RCS and the second, third, etc. best-serving CSs may be established. The multiple assigned CSs service the RCS for the requested communication (step 220).

Figure 3A:
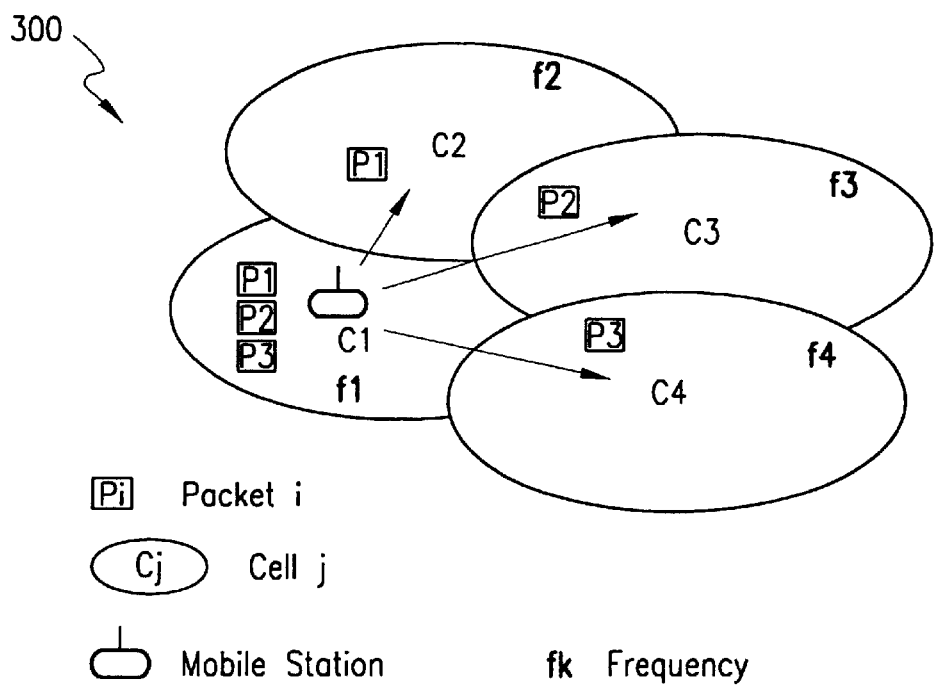
FIG. 3A illustrates a portion of a wireless network in which an MS is being served by multiple cells in accordance with another embodiment of the present invention.

Referring now to FIG. 3A, a portion of a wireless network in which an MS is being served by multiple cells in accordance with another embodiment of the present invention is illustrated generally at 300. In this embodiment, the coverage units A, D, F, etc. shown in the wireless network 100 (of FIG. 1) correspond to cells (e.g., $C_j$, j=1 ... 4); the CSs 110, 135, 140, etc. correspond to BSs (not shown); the RCSs 115, 120, 155, etc. correspond to the MS; and the WNC 105 corresponds to an MSC (not shown). Each cell $C_j$ operates with an assigned frequency fk, k=1 ... 4. The MS is involved in an information flow requiring three time slots, one for each of three packets (e.g., Pi, i=1 ... 3).

In a TDMA system such as the wireless network portion 300 that is operating in accordance with the principles of the present invention, a high data-rate user may be assigned multiple time slots in order to aggregate a sufficient data rate. The fact that the information flow is already divided into multiple slots can be advantageously used when assigning multiple serving cells to the MS in the wireless network portion 300. In the wireless network portion 300, a three-slot-user associated with the MS is served by three cells. Specifically, the MS sends packet P1 to cell C2, packet P2 to cell C3, and packet P3 to cell C4. The user associated with the MS is therefore able to engage in a high data-rate information flow even when the cell in which the MS is located, namely cell C1, is congested. Furthermore, the resources required to service the high data-rate information flow are distributed over three cells, namely cells C2, C3, and C4. It should be noted that the principles of multiple serving coverage units in accordance with the present invention may also be applied during handoff from one coverage unit to another coverage unit. Applying the present invention's principles during handoff is advantageous when a high data-rate user is unable to acquire all the requested resources at once by the coverage unit to which the user is being handed off. Thus, during the transition period the high data-rate user may be served by more than one coverage unit in order to continue providing the high data-rate information flow.

Figure 3B:
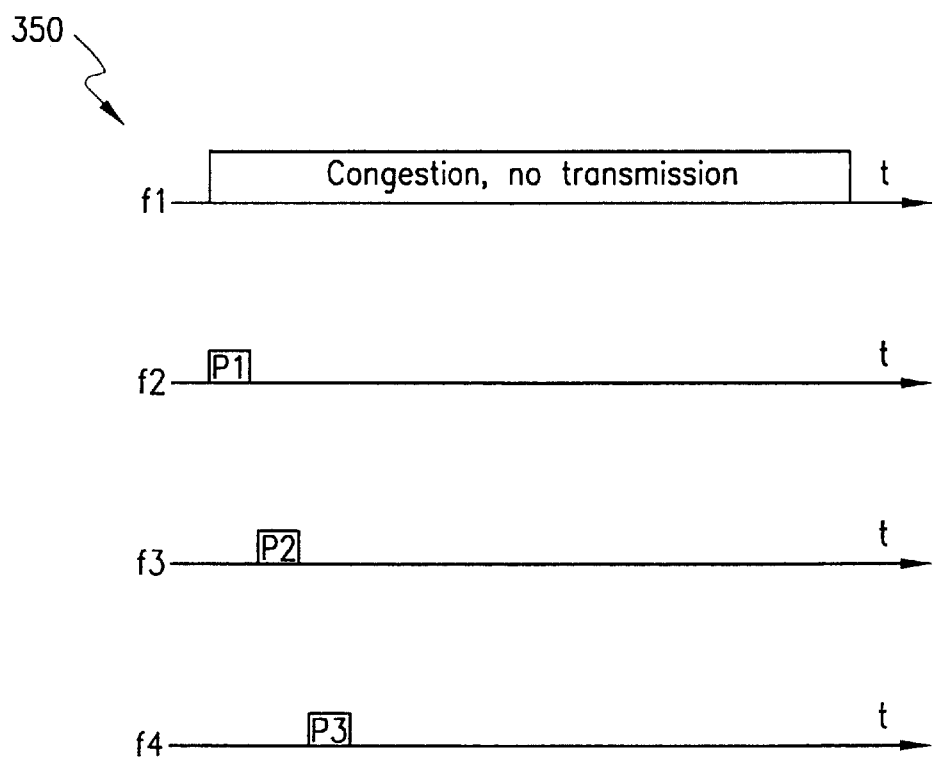
FIG. 3B illustrates graphs with frequency, time, and time slot information for each cell of FIG. 3A in accordance with the present invention.

Referring now to FIG. 3B, graphs with frequency, time, and time slot information for each cell of FIG. 3A in accordance with the present invention are illustrated generally at 350. Each of the four graphs of 350 are labeled with a frequency fk (e.g., f1, f2, f3, and f4) that corresponds to a cell $C_j$ (e.g., C1, C2, C3, and C4, respectively). Time t elapses along each of the graphs of 350 from left to right. As shown, congestion prevents transmission at frequency f1 for cell C1. However, the high data-rate user associated with the MS transmits packet P1 at frequency f2 to cell C2 in a time slot, packet P2 at frequency f3 to cell C3 in the next time slot, and packet P3 at frequency f4 to cell C4 in the following time slot. It should be understood, however, that the present invention is not limited to employing successive time slots. For example, packet P3 may be transmitted two time slots after packet P2. In order to implement this embodiment and send time slots from several BSs to one MS, the BSs are preferably synchronized. This may be accomplished at the system level. Moreover, a correct timing advance (TA) to several BSs is preferably maintained by the MS, which may require further configuring of the MS. Additionally, the traditional protocol structure (e.g., in the GSM Packet Radio Service (GPRS)) assumes a single serving cell. Combining data sent to and dividing data to be sent from several BSs requires further orchestration at the network level.

Figure 4:
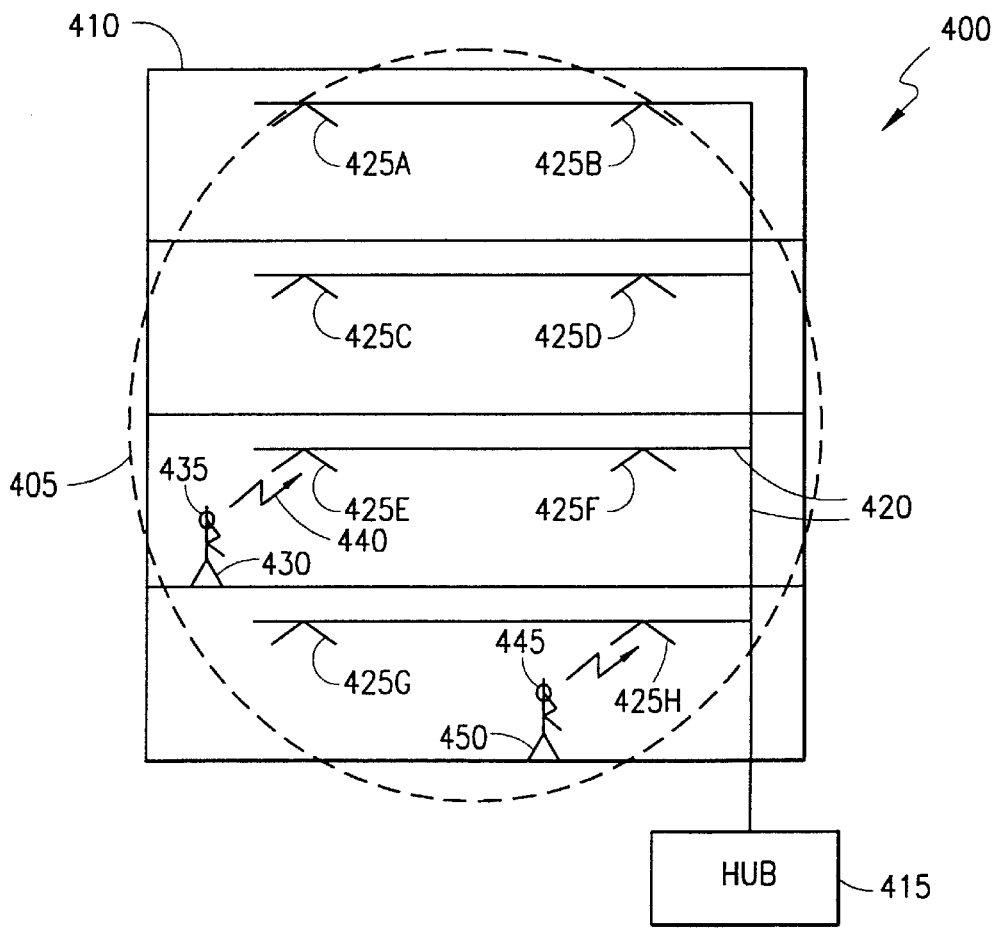
FIG. 4 illustrates a local wireless network in which an MS may be served by multiple radio heads in accordance with yet another embodiment of the present invention.

Referring now to FIG. 4, a local wireless network in which an MS may be served by multiple radio heads in accordance with yet another embodiment of the present invention is illustrated generally at 400. In this embodiment, the synchronization, TA, and protocol issues are eliminated. The local wireless network 400 is distributed over a building 410. Local wireless network 400 is controlled by a local wireless network controller (e.g., a HUB) 415. The HUB 415 is connected via a series of wireline links 420 to multiple radio heads 425 (e.g., radio heads 425A–425H). Although only eight radio heads 425 are illustrated, a local wireless network 400 may include more or fewer radio heads 425. A user 430 with an MS 435 is in communication with a radio head 425E via wireless link 440. If the resources of the radio head 425E are insufficient to service a particular information flow from the MS 435, the information flow may be shared with one or more other radio heads 425, such as radio heads 425C, 425F, 425G, and 425H.

The indoor wireless network 400 operates on a principle of small radio heads connected to a local radio network controller, the HUB 415. All of the radio heads 425 may simulcast the same BCCH information, thus acting as one cell towards the MSs 435 and 445 and other cells in the system (not shown). The TCH(s), on the other hand, are only transmitted from a subset of the radio heads 425 that are close to the MS 435. It should be noted that the principle of a HUB with distributed radio heads is not limited to indoor systems. A number of micro cells, for example, may also be controlled by a HUB. Advantageously, the micro cells connected to a HUB are also synchronized and also act as one cell (e.g., same BCCH). When the MS 435 moves within the building 410, the system changes the radio heads 425 that are serving the MS. The same frequency/time slot pair can therefore be assigned to several users 430 and 450 in different locations in the building 410.

In this embodiment, the coverage units A, D, F, etc. shown in the wireless network 100 (of FIG. 1) correspond to radio head 425 coverage units (not explicitly delineated); the CSs 110, 135, 140, etc. correspond to the radio heads 425; the RCSs 115, 120, 155, etc. correspond to the MSs 435 and 445; and the WNC 105 corresponds to the HUB 415. Thus, instead of the principle of multiple serving cells described in an embodiment above, the principle of multiple serving radio heads is described in this embodiment. If a single radio head 425E has limited hardware capabilities (which is the typical case because the radio heads 425 are small and based on terminal hardware), several radio heads 425 may be used to send data to a single user 430. Hence, the synchronization issue is eliminated because all radio heads 425 are already synchronized. Likewise, the TA issue is eliminated because the propagation delays are negligible since the distances are relatively short. Furthermore, the protocol issue is handled in the HUB 415 because it acts as one cell with respect to the rest of the network. In fact, modifying the protocol stack internal to the HUB 415 is sufficient to properly merge and split data streams on several radio heads 425.

Figure 5:
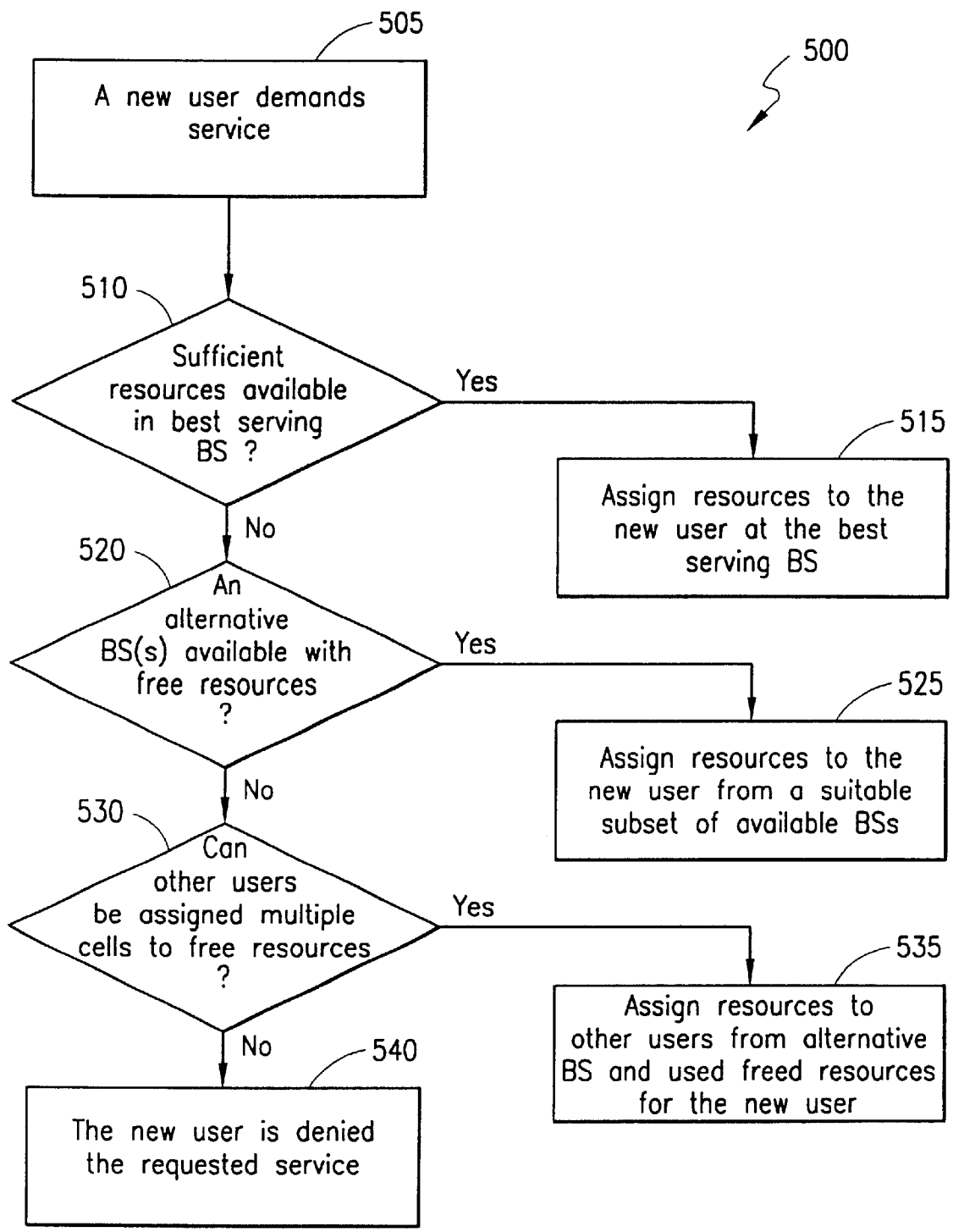
FIG. 5 illustrates an exemplary method in flowchart form for assigning resources of multiple base stations to a user requesting service in accordance with still another embodiment of the present invention.

Referring now to FIG. 5, an exemplary method in flowchart form for assigning resources of multiple base stations to a user requesting service in accordance with still another embodiment of the present invention is illustrated generally at 500. The flowchart 500 begins when a new user demands service (step 505). Alternatively, the flowchart 500 may begin when an existing user demands increased bandwidth for an existing information flow. After the service is demanded (at step 505), the wireless network (e.g., at the WNC) determines whether sufficient resources are available in the best serving BS (step 510). It should be noted that flowchart 500 is directed to an embodiment including (i) coverage areas that are cells and (ii) CSs that are BSs; however, other methods for other embodiments are analogous as will be apparent to one of ordinary skill in the art after reading and understanding the principles of the present invention.

If sufficient resources are available in the best serving BS (at step 510), such resources are assigned to the new user at the best serving BS (step 515). If, on the other hand, sufficient resources are not available at the best serving BS (at step 510), the wireless network determines whether an alternative BS or alternative BSs are available with free resources (step 520). If so, such free resources are assigned to the new user from a suitable subset of the available BS(s) (step 525). The suitable subset of available BS(s) with free resources may be determined using a myriad of criteria. For example, adjacent BS(s) may be selected, those BS(s) having the highest signal quality (e.g., highest carrier-to-interference (C/I) ratio, etc.) may be selected, those BS(s) with the most free resources may be selected, etc. Furthermore, a weighted or non-weighted combination of such criteria may be employed.

If, however, the wireless network is unable to determine alternative BS(s) that are available with free resources (at step 520), the wireless network may instead attempt to determine whether other users may be assigned multiple cells in order to free resources (step 530). If so, the wireless network assigns resources to other users from their alternative BS(s) and uses the freed resources for the new user (step 535). If the wireless network is unable to assign multiple cells to other users to free resources (at step 530), then the new user is denied the requested service (step 540). In this manner, the network attempts to accommodate high data-rate users that request service from a BS whose resources are congested.

In an alternative embodiment, the assignment/allocation of multiple serving CSs is precipitated by analysis conducted by the wireless network. For example, a method of allocating radio resources for certain data users may begin with a first step of selecting a user that needs additional radio resources. This need may be identified by, for instance, the user subscription or the current performance perceived by the data application. For example, a data application that perceives delays near the maximum acceptable limit (which may be service-type dependent).

In a second step, the wireless network selects suitable non-best serving coverage units for each user. These may be identified by, for instance, the received signal strength as compared to the signal strength in the optimal coverage unit and a given threshold. In a third step, packet transmissions are scheduled from more than one coverage unit. Thus, radio resources are allocated in the optimal coverage unit and, if necessary, also in one or more sub-optimal coverage units.

Although preferred embodiment(s) of the method and system of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for accommodating a high data-rate information flow in a wireless communications network, comprising the steps of:

receiving a request from a remote communication station for bandwidth;

determining whether sufficient resources to service said bandwidth are available in a first communication station;

if not, determining whether said sufficient resources to service said bandwidth are available using a plurality of communication stations, if so, transferring a first unit of information between said remote communication station and said first communication station during a frame, wherein said frame comprises a plurality of time slots;

transferring a second unit of information between said remote communication station and a second communication station during said frame; and combining said first unit of information and said second unit of information into said high data-rate information flow, wherein said first unit of information differs from said second unit of information.

2. The method according to claim 1, further comprising the steps of:

if not, determining whether at least one other remote communication station may be reassigned to a plurality of different communication stations in order to free additional resources;

if so, reassigning said at least one other remote communication station to free said additional resources and using said additional resources to provide, at least partially, said bandwidth to said remote communication station.

3. The method according to claim 2, further comprising the step of:

otherwise, denying said remote communication station said bandwidth.

4. The method according to claim 1, wherein said first communication station comprises a best serving communication station with respect to said remote communication station.

5. The method according to claim 1, wherein said first and second communication stations comprise base stations, and said remote communication station comprises a mobile station.

6. The method according to claim 1, wherein said first and second communication stations comprise radio heads, and said remote communication station comprises a mobile station.

7. The method according to claim 1, wherein said step of receiving said request from said remote communication station for bandwidth further comprises the step of receiving said request for a new service.

8. The method according to claim 1, wherein said step of receiving said request from said remote communication station for bandwidth further comprises the step of receiving said request for additional bandwidth for an existing service.

9. The method according to claim 1, wherein said plurality of communication stations are selected for determination based, at least in part, on at least one selected criterion.

10. The method according to claim 1, wherein said steps of transferring a first unit of information and transferring a second unit of information further comprise the steps of transferring said first unit of information to said remote communication station from said first communication station and transferring said second unit of information to said remote communication station from said second communication station, respectively.

11. The method according to claim 10, wherein said step of combining occurs at said remote communication station.

12. The method according to claim 1, wherein said steps of transferring a first unit of information and transferring a second unit of information further comprise the steps of transferring said first unit of information from said remote communication station to said first communication station and transferring said second unit of information from said remote communication station to said second communication station, respectively.

13. The method according to claim 12, wherein said step of combining occurs responsive to control of a wireless network controller.

14. The method according to claim 13, wherein said wireless network controller comprises at least one of a mobile services switching center and a HUB of a local wireless network.

15. The method according to claim 1, wherein said remote communication station comprises a mobile station and said first and second communication stations comprise at least one of a base station and a radio head of a local wireless network.

16. The method according to claim 1, wherein said first unit of information and said second unit of information are transferred in successive time slots.

17. A wireless network system for enabling high data-rate information flows, comprising:
- a plurality of communication stations, each of said plurality of communication stations adapted to transfer information units;
- at least one remote communication station, said at least one remote communication station in wireless communication with said plurality of communication stations and adapted to transfer at least two different information units to or from at least two different communication stations of said plurality of communication stations during a single frame, wherein said single frame comprises a plurality of time slots; and
- a wireless network controller, said wireless network controller coupled to said plurality of communication stations and configured to coordinate and synchronize the transfer of said at least two different information units to or from said at least two different communication stations of said plurality of communication stations, said wireless network controller further configured to precipitate a combination of said different information units into a high data-rate information flow.

18. The wireless network system according to claim 17, wherein said wireless network system comprises a local wireless network system and said wireless network controller comprises a HUB of said local wireless network system.

19. The wireless network system according to claim 18, wherein said local wireless network system comprises an indoor local wireless network system.

20. The wireless network system according to claim 17, wherein said at least one remote communication station comprises a mobile station and said plurality of communication stations comprise a plurality of radio heads.

21. The wireless network system according to claim 17, wherein said wireless network system comprises a time division multiple access system, said at least one remote communication station comprises a mobile station, said plurality of communication stations comprise a plurality of base stations, and said wireless network controller comprises a mobile services switching center.

* * * * *